July 6, 1965     T. S. SPRAGUE     3,193,468
BOILING COOLANT NUCLEAR REACTOR SYSTEM
Filed July 12, 1960
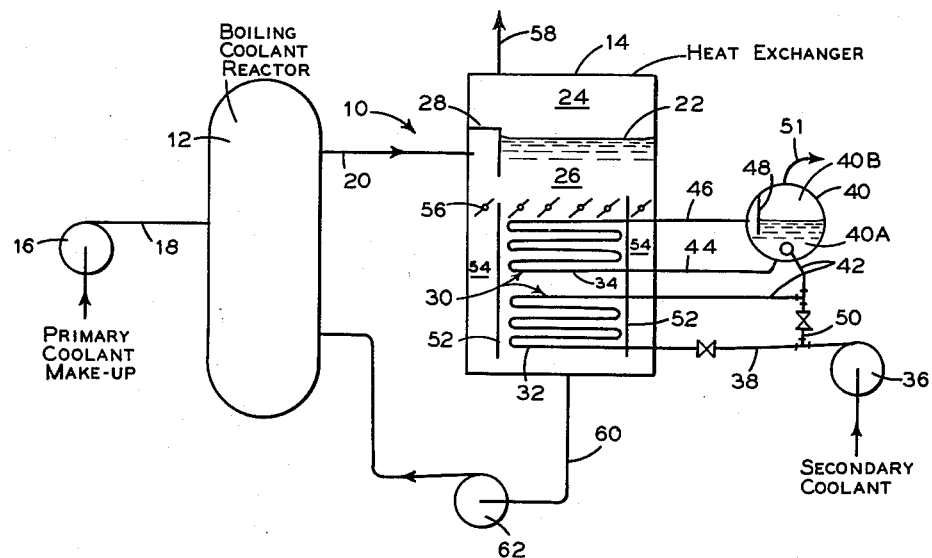
INVENTOR.
Theodore S. Sprague
BY
ATTORNEY 3,193,468
BOILING COOLANT NUCLEAR REACTOR SYSTEM
Theodore S. Sprague, Hudson, Ohio, assignor to The Babcock & Wilcox Company, New York, N.Y., a corporation of New Jersey
Filed July 12, 1960, Ser. No. 42,250
3 Claims. (Cl. 176—55)

This invention relates in general to a boiling coolant nuclear reactor system, and more particularly to a boiling coolant nuclear reactor system in which the vaporized primary coolant is separated into its vapor and liquid portions with the vapor portion being employed, for example, in a prime mover and the liquid portion being employed to heat a secondary coolant by indirect heat transfer.

This invention is particularly adapted to be used in a boiling coolant nuclear reactor system in which the primary coolant operates at a higher temperature and pressure than the secondary coolant. In such a reactor system the separated liquid portion of the primary coolant which heats the secondary coolant can be regulably cooled to selectively fix the temperature at which it is recirculated to the boiling coolant reactor. By using a primary coolant, such as light or heavy water, which has a negative temperature coefficient of reactivity, it is possible to control the reactor by regulating the temperature of the primary coolant which is recirculated to the reactor. The negative temperature coefficient of reactivity is a well known phenomenon in nuclear reactors and may be characterized in that an increase in the temperature of the coolant causes a decrease in the reactivity of the reactor. For a more complete discussion of the negative temperature coefficient of reactivity, reference is made to Principles of Nuclear Reactor Engineering, Samuel Glasstone, D. Van Nostrand Company Inc., first edition, chapters 4 and 6.

This invention provides a method of employing the liquid portion of a primary coolant fluid to heat a secondary coolant. After the primary coolant is caused to boil in the fission reaction zone of the boiling coolant reactor, the vapor and liquid portions of the primary coolant fluid are separated. The vapor portion is removed from the separator for use in a prime mover, for example, while the liquid portion is passed into an enclosed space which contains both a heat exchange zone and a by-pass zone. The secondary coolant passes through the heat exchange zone in indirect heat exchange relationship with the liquid portion of the primary coolant. By regulably channelling the flow of the liquid portion within the enclosed space to the heat exchange zone and to the by-pass zone, the proportionate amount of liquid portion flow to the heat exchange zone is controlled and the temperature to which it is cooled as it flows therethrough is selectively fixed. After passing through the enclosed space, the liquid portion is recirculated to the fission reaction zone of the boiling coolant reactor.

Additionally, the present invention contemplates a boiling coolant nuclear reactor system in which a vaporizable primary coolant is boiled as it flows through the core of a boiling coolant reactor. A separator is arranged to receive and separate the vaporized primary coolant into its vapor and liquid portions after its passage through the core. Means are provided for collecting the vapor portion from the separator and conveying it to a point of use, while the liquid portion upon leaving the separator passes over heat transfer surfaces through which a secondary coolant is passed to be heated by indirect heat transfer therewith. Adjustable dampers are positioned to direct the flow of the liquid portion over the heat transfer surfaces or to a by-pass channel provided by baffle means which permits by-passing of the heating surfaces by the primary coolant. After passage either over the heat transfer surfaces or through the by-pass channel means are provided for recirculating the cooled liquid portion of the primary coolant to the core of the boiling coolant reactor.

Various features of novelty which characterize the invention are pointed out with particularity in the claims annexed to and forming part of this specification. For a better understanding of the invention, its operating advantages and specific objects attained by its use, reference should be had to the accompanying drawing and descriptive matter in which a certain specific embodiment of the invention is illustrated and described.

The drawing is a schematic diagram of a boiling coolant nuclear reactor system 10 comprising a boiling coolant reactor 12 and a heat exchanger 14. A pump 16 delivers primary coolant makeup to the boiling coolant reactor 12 through the line 18. Line 20 delivers the boiling primary coolant, which has been heated within the core (not shown), from the reactor 12 to the heat exchanger 14.

A normal liquid level 22 divides the heat exchanger 14 into an upper vapor space 24 and a lower liquid space 26. A separator 28 is positioned within the heat exchanger 14 to receive the boiling primary coolant from the line 20. The upper part of the separator 28 is positioned within the vapor space 24 and the lower part extends downwardly below the liquid lever 22 into the liquid space 26. While the separator 28 is shown only schematically, it is contemplated that a cyclone type vapor-liquid separator such as shown in U.S. Patent No. 2,289,970 or a baffle type vapor-liquid separator as shown in "Steam, Its Generation and Use," The Babcock & Wilcox Company, thirty-seventh edition, second printing, chapter 29, Figures 2, 10 and 26, could be used.

Heat exchange surfaces 30 located within the liquid space of the heat exchanger are divided into an economizer section 32 and a boiler section 34. Pump 36 delivers secondary coolant to the heat exchange surfaces 30 through valved line 38. A secondary upper drum 40 having a lower liquid space 40A and an upper vapor space 40B is positioned exteriorly of the heat exchanger 14 and receives secondary coolant from the economizer section 32 through economizer outlet line 42 which discharges into the liquid space 40A. In addition, the boiler section 34 is connected to the drum 40 by means of inlet line 44 connected to the liquid space 40A. Outlet line 46 is connected to a separator 48 located within the secondary coolant drum to separate the heated secondary coolant in its vapor and liquid fractions. It is contemplated that the separator 48 may also be one of any of the types previously mentioned in connection with the separator 28 in the heat exchanger 14. Valved by-pass line 50 interconnects the inlet line 38 with the economizer outlet line 42. Outlet line 51 delivers secondary vapor from vapor space 40B to a point of use.

Baffle plates 52 are positioned adjacent the heat exchange surfaces 30, providing channels 54 for by-passing the surfaces. Adjustable dampers 56 are positioned within the liquid space above the heat exchange surfaces 30 and across the width of the heat exchanger 14 for channelling flow of the liquid portion of the primary coolant to the heat exchange surfaces 30 and the by-pass channels 54. The adjustable dampers 56 are positioned to individually control the proportionate amounts of the liquid portion flowing over the heat exchange surfaces and through the by-pass channel.

A vapor outlet line 58 opens from the top of the heat exchanger to deliver the vapor portion of the separated primary coolant to a point of use. As mentioned herein, a point of use refers to useful work performed by the vapor, such as expansion through a vapor turbine, or process heating rather than the giving up of heat, as in the case of heating the secondary coolant within the heat exchange surfaces.

A primary water recirculating line 60 is connected at its inlet end to the liquid space 26 of the heat exchanger 14 and at its outlet end to the boiling coolant reactor 12. A pump 62 is positioned in line 60 to return the primary coolant to the reactor 12.

As mentioned earlier, the boiling coolant nuclear reactor system 10 is particularly directed to use in a dual pressure system. Typically temperature and pressure operating conditions for such a system using light water for both the primary and secondary coolant would be as follows: the primary coolant at a pressure of 1,200 p.s.i.a. and at a reactor outlet temperature of 567° F. the secondary coolant at a pressure of 600 p.s.i.a. and at a drum outlet temperature of 486° F.

The boiling coolant nuclear reactor system as shown in the drawings operates in the following manner: the primary coolant (light water) makeup is delivered to the reactor 12 through the line 18 and the recirculated primary coolant is admitted through the line 60. As it passes through the core or fission reaction zone (not shown) of the reactor 12, the primary coolant is boiled and it leaves the reactor through the line 20 as a vapor-liquid mixture, entering the separator 28 in the heat exchanger 14 wherein it is separated into its vapor portion and its liquid portion. The vapor portion collects in the vapor space 24, leaving the heat exchanger through the line 58 for delivery to a point of use. At the same time, the separated liquid portion enters the liquid space 26 and flows downwardly therethrough.

It will be recognized that both the primary and secondary coolant systems are separate and distinct circuits. Moreover, the primary circuit is a closed system, wherein the steam delivered through vapor outlet 58 to point of use is subsequently condensed and returned to pump 16 for reintroduction into the system, augmented as necessary by makeup to take care of line losses. Thus the mass of vapor-liquid contained within the primary coolant system is maintained substantially constant and the level 22, in heat exchanger 14 will, therefore, remain essentially stable throughout the range of conditions normally experienced during operation.

Within the heat exchanger the liquid portion of the primary coolant can be cooled to a selectively fixed temperature by the adjustable dampers 56 in that the liquid portion of the primary coolant can be regulably channelled to flow either over the heat exchange surfaces 30 only, or over the heat exchange surfaces and through the by-pass channel 54, thereby proportioning the quantity of liquid primary coolant which is cooled by contacting the heat exchange surfaces.

In addition, a further degree of primary coolant cooling can be effected by controlling the proportionate amount of flow of the secondary coolant through the heat exchange surfaces 32 and 34. The secondary coolant (light water) is admitted to the heat exchange surfaces through the valved inlet line 38 which is normally open. The secondary coolant flows through the economizer section 32 and then through the outlet line 42 to the liquid space 40A of the secondary coolant drum 40. From the drum the secondary coolant flows through inlet line 44 into the boiler section 34 and then through the outlet line 46 to the drum, wherein separator 48 divides the coolant into its vapor and liquid fractions. From the drum the vapor fraction is delivered to a point of use through outlet 51 and the liquid fraction is recirculated through the boiler section 30 of the heat exchange surfaces. In this arrangement valved by-pass line 50 is normally closed, however, when desired, flow through the economizer section 32 can be controlled by adjustment of the valve in line 38 and the valve in by-pass line 50. In this way, all of the secondary coolant or any portion thereof by-passes the economizer section 32 and flows directly to the secondary coolant drum 40 and from there circulates through the boiler section 34 of the heat exchange surface 30. Thus the temperature of the liquid portion of the primary coolant can also be controlled by selectively regulating the flow of secondary coolant within the economizer system 32 which is in indirect heat transfer relationship with the primary coolant. Primary coolant temperature can also be regulated by varying the amount of secondary coolant flowing.

After flowing through the heat exchanger 14, the cooled liquid portion of the primary coolant returns to the boiling coolant reactor 12 through line 60. A pump 62 is positioned in the line 60 to provide the requisite pressure for the recirculated primary coolant.

The primary vapor flows from the vapor space 24 through the outlet line 58 to a point of use such as a high pressure turbine. Though not illustrated, it is contemplated that this primary vapor could be passed through a separately fired superheater to provide superheated vapor to improve cycle efficiency. Further, it is also possible to reheat the primary vapor for further use after it passes through the first stage of the high pressure turbine by passing it in indirect heat transfer relationship through the liquid space 26 of the heat exchanger 14.

As with the primary coolant vapor, the vapor fraction of the secondary coolant generated in heat exchange surfaces 30, is passed from drum 40 to a point of use such as a low pressure turbine or other heat user.

As previously pointed out, it is possible to regulate the temperature of the recirculated primary coolant by regulating the proportion of the liquid portion of the primary coolant which flows over the heat exchange surfaces and also by (1) controlling the amount of heat exchange surface through which the secondary coolant flows and (2) by regulating the amount of secondary coolant flowing. If a higher power output is required from the boiling coolant reactor, then it is necessary to permit a greater amount of reactivity within the core of the reactor. This reactivity control can be achieved by varying the inlet temperature of the primary coolant to the core, or by combining this control with other reactor control systems.

To increase the reactivity of the core, it is necessary to increase the degree of cooling to which the liquid portion of the primary coolant is subjected. This can be done first, by increasing the flow of the primary coolant over the heat exchange surfaces to provide a greater degree of cooling of the liquid portion. Additionally, by passing all of the secondary coolant through both the economizer and boiler sections of the heat exchange surfaces, the maximum temperature reduction of the liquid portion of the primary coolant, as it flows through the liquid space of the heat exchanger is effected.

Conversely, if the power output of the reactor is to be reduced, the reactivity can be inhibited by permitting the primary coolant liquid to return to the reactor at a higher temperature. This can be done by decreasing the degree of cooling to which the liquid portion of the primary coolant is subjected as it passes through the heat exchanger as, for example, by using the liquid by-pass channel 54. This invention, therefore, provides an arrangement whereby the boiling coolant reactor can be controlled by regulating the temperature of recirculated primary coolant.

While in accordance with the provisions of the statutes I have illustrated and described herein the best form of the invention now known to me, those skilled in the art will understand that changes may be made in the form of apparatus disclosed without departing from the spirit of the invention covered by my claims, and that certain features of my invention may be some times used to advantage without a corresponding use of other features.

What is claimed is:

1. A boiling coolant nuclear reactor system, in which a heated vaporizable primary coolant is used to heat a secondary coolant, comprising a boiling coolant reactor having a core arranged to release heat in a controlled fission chain reaction to boil the primary coolant, walls forming a heat exchanger divided by a normal liquid level into an upper vapor space and a lower liquid space, a first conduit arranged to flow said boiling primary coolant from said reactor to said heat exchanger, a mechanical vapor-liquid separator located within said heat exchanger to receive and to separate the boiling primary coolant from said reactor into its vapor portion and liquid portion and to discharge the vapor portion to said vapor space and the liquid portion to said liquid space, heat transfer surfaces located within said heat exchanger below the liquid level therein, means for flowing secondary coolant through said heat transfer surfaces, baffle means positioned within the liquid space in said heat exchanger to provide a by-pass channel around said heat transfer surfaces, adjustable means for directing said primary coolant liquid portion to said heat transfer surfaces and to said by-pass channel, and a second conduit connected at its inlet end to the lower end of said liquid space of said heat exchanger to recirculate the cooled liquid portion of said primary coolant to said reactor.

2. A boiling coolant nuclear reactor system, in which a heated vaporizable primary coolant is used to heat a vaporizable secondary coolant, comprising a boiling coolant reactor having a core arranged to release heat in a controlled fission chain reaction to boil the primary coolant, walls forming a heat exchanger divided by a normal liquid level into an upper vapor space and a lower liquid space, a first conduit arranged to flow said boiling primary coolant from said reactor to said heat exchanger, a mechanical vapor-liquid separator located within said heat exchanger to receive and to separate the boiling primary coolant received from said reactor into its vapor portion and liquid portion and to discharge the vapor portion to said vapor space and the liquid portion to said liquid space in said heat exchanger, heat transfer surfaces located within said heat exchanger below the liquid level therein and divided into serially connected first and second sections, means for flowing a variable quantity of secondary coolant through said heat transfer surfaces, means for by-passing secondary coolant around the first section of said heat transfer surfaces, baffle means positioned within the liquid space in said heat exchanger to provide a by-pass channel around said heat transfer surfaces, individually adjustable dampers for directing the primary coolant liquid portion to said heat transfer surfaces and to said by-pass channel, and a second conduit connected at its inlet end to the lower end of said liquid space of said heat exchanger to recirculate the cooled liquid portion of said primary coolant to said reactor.

3. A boiling coolant nuclear reactor system, in which a heated vaporizable primary coolant is used to heat a vaporizable secondary coolant, comprising a boiling coolant reactor having a core arranged to release heat in a controlled fission chain reaction to boil the primary coolant, walls forming a heat exchanger divided by a normal liquid level into an upper vapor space and a lower liquid space, a first conduit arranged to flow boiling primary coolant from said reactor to said heat exchanger, a mechanical vapor-liquid separator located within said heat exchanger and having its vapor outlet positioned above and its liquid outlet positioned below said liquid level, said separator arranged to receive and to separate the boiling primary coolant received from said reactor into its vapor portion and its liquid portion and to discharge the vapor portion to said vapor space and the liquid portion to said liquid space, heat transfer surfaces located within said heat exchanger below the liquid level therein and divided into serially connected economizer and boiler sections, means for flowing a variable quantity of secondary coolant through said heat transfer surfaces, means for by-passing secondary coolant around the economizer section of said heat transfer surfaces, baffle walls positioned around the heat transfer surfaces in said liquid space to provide a by-pass channel around said heat transfer surfaces, adjustable dampers for selectively directing said primary coolant liquid portion to said heat transfer surfaces and to said by-pass channel, and a second conduit connected at its inlet end to the lower end of said liquid space of said heat exchanger to recirculate the cooled liquid portion of said primary coolant to said reactor.

References Cited by the Examiner

UNITED STATES PATENTS

| | | | |
|---|---|---|---|
| 86,321 | 1/69 | Reynolds | 122—491 |
| 1,822,397 | 9/31 | Gosselin | 257—230 |
| 2,150,505 | 3/39 | Hunicke | 165—103 |
| 2,657,018 | 10/53 | Simpelaar | 165—103 |
| 3,029,197 | 4/62 | Untermyer | 176—55 |
| 3,070,536 | 12/62 | Taylor et al. | 176—56 |

FOREIGN PATENTS

| | | |
|---|---|---|
| 215,410 | 6/58 | Australia. |
| 218,951 | 11/58 | Australia. |
| 572,869 | 11/58 | Belgium. |
| 1,214,344 | 11/59 | France. |
| 1,233,964 | 5/60 | France. |
| 792,171 | 3/58 | Great Britain. |

OTHER REFERENCES

Progress Report on Dresden Station, A Design Description of the Dresden Nuclear Power Station, presented at the ASME Annual Meeting, New York, Nov. 26, 1956, General Electric Publication Number GER–1301, pp. 3–5.

German printed application No. 1,049,984, February 1959.

CARL D. QUARFORTH, *Primary Examiner.*

ROGER L. CAMPBELL, *Examiner.*

UNITED STATES PATENT OFFICE
CERTIFICATE OF CORRECTION

Patent No. 3,193,468                                              July 6, 1965

Theodore S. Sprague

It is hereby certified that error appears in the above numbered patent requiring correction and that the said Letters Patent should read as corrected below.

In the grant (only), line 1, for "Theodore S. Sparague" read -- Theodore S. Sprague --; column 3, line 12, for "Typically" read -- Typical --.

Signed and sealed this 15th day of March 1966.

(SEAL)
Attest:

ERNEST W. SWIDER
Attesting Officer

EDWARD J. BRENNER
Commissioner of Patents